No. 858,048. PATENTED JUNE 25, 1907.
R. M. WHITMAN.
APPARATUS FOR THE MANUFACTURE OF ELASTIC TIRES.
APPLICATION FILED DEC. 26, 1906.
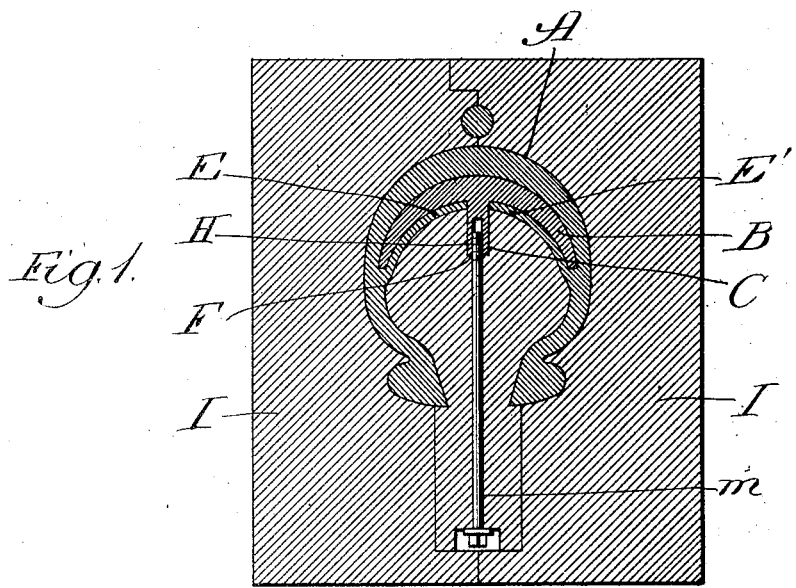
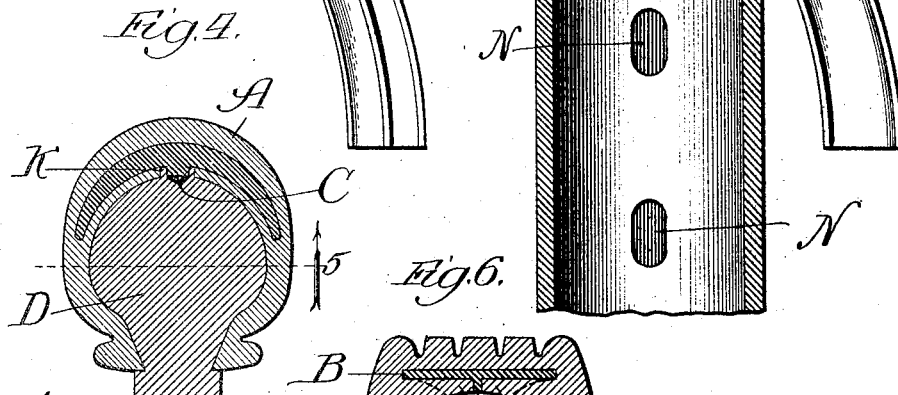
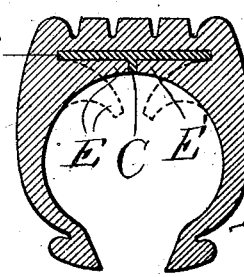
Witnesses:
Chas. L. Gaylord.
John Enders.
Inventor:
Ralph M. Whitman,
By Robert Catherwood
Atty.

UNITED STATES PATENT OFFICE.

RALPH MYERS WHITMAN, OF PROVIDENCE, RHODE ISLAND.

APPARATUS FOR THE MANUFACTURE OF ELASTIC TIRES.

No. 858,048.　　　　　　Specification of Letters Patent.　　　　Patented June 25, 1907.

Original application filed June 27, 1906, Serial No. 323,731. Divided and this application filed December 26, 1906. Serial No. 349,402.

*To all whom it may concern:*

Be it known that I, RALPH MYERS WHITMAN, a citizen of the United States, residing at Providence, in the county of Providence and State of Rhode Island, have invented certain new and useful Improvements in Apparatus for the Manufacture of Elastic Tires, of which the following is a specification.

My invention relates to apparatus for the manufacture of elastic tires. Its objects are to provide convenient and efficient means for constructing elastic tires and introducing puncture proof material into the body thereof without subjecting such material to the heat incident to vulcanization.

Some of the forms of tires, and the process of constructing them, to which the present invention is particularly applicable, are more fully described in my copending application, Serial No. 323,731, filed June 27, 1906, from which the present case has been divided.

In the accompanying drawings, I have shown apparatus embodying one of the preferred forms of my invention.

Figure 1 is a view taken in cross-section showing one of my molds having a tire therein. Fig. 2 shows, in perspective, one of my supplemental cores for forming in the body of the tire a recess adapted to receive a puncture proof shield. Fig. 3 shows, in perspective, a section of one of my puncture proof shields. Fig. 4 shows a modification of Fig. 1, the upper mold being omitted. Fig. 5 shows a section taken on line 5 of Fig. 4. Fig. 6 shows a modification in which the supplemental core is made substantially flat instead of curved in the cross-section.

D represents the ordinary core, preferably made in sections so as to be readily removable.

I, I represents the outer sections of the mold.

A represents the elastic portion of the tire.

B represents a supplemental core connected to the core D by the projection C and supported in such positive relation to the core D as to afford space for a portion of the tire, indicated by E, E'. This supplemental core B may be made of iron, steel, or any suitable material adapted to stand the heat incident to vulcanization. The supplemental core is preferably divided into sections. I have found it convenient to make it in about four sections, and the shields in corresponding sections. The projection C may either be formed by one or more pins extending from the body of the supplemental mold B into a corresponding recess F in the core D (Fig. 4) or by a continuous tongue or edge extending circumferentially along the shield B (Figs. 1 and 2), the recess F being correspondingly extended, or the core D may have a socket extending forward to embrace the pin or other projection on B, as illustrated by the socket K in Fig. 4.

N, N, Fig. 5, represent holes formed on the inner wall of the tire by the pins projecting from the supplemental core. These pins will be continuous with a continuous tongue, or corresponding projections will receive corresponding holes in core D.

L shows the shield, it being understood that it extends circumferentially of the tire.

$m$ is a rod extending through core D having a screw-thread H at its upper end and adapted to engage by such thread with a correspondingly threaded socket in projection C, thereby securing supplemental core B firmly in place and enabling core D to be readily released therefrom when desired.

In the operation of my device, sheets of the material of which the elastic tire is composed (generally a composition of rubber or such materials as are commonly used in the construction of elastic tires) are placed on both sides of the core D meeting at the top, or extending to the recess for the projection C, and of sufficient thickness to fill the space occupied by the flaps E, E'. The supplemental core is then applied in the position shown in Figs. 1, 4 or 6, and material thereafter added sufficient to form the entire body of the tire A, which is then ready for vulcanization in the ordinary way. When the core is removed the flaps E, E' can be bent, as illustrated by dotted lines, to permit the withdrawal of the supplemental core B and the insertion in place of this supplemental core of a puncture proof shield adapted to fill the space afforded, when the flaps are returned to the position from which they have been bent and the division between the flaps covered and sealed by a strip preferably of elastic material, cemented or otherwise attached along the joint.

I prefer to use a shield of hard, tough leather, but my invention is adapted to use with shields composed of other materials. My invention enables the shield to be introduced into the body of the vulcanized tire in the most favorable position and made as tough and rigid as may be desired without being exposed to the heat of vulcanization, while the elastic body of the tire may be vulcanized in the form which it is to permanently retain. It also affords a convenient and economical mode of construction and enables the puncture proof shield to be withdrawn and replaced without disruption of the tire.

While I have illustrated one style of tire adapted to be attached to the rim of a wheel in one of the ordinary ways, my invention is adapted to other forms of tire and rim, and the modifications necessary for the practice of my invention in making such other forms of tires will readily suggest themselves to those skilled in the art.

I claim as my invention:—

1. In combination with a main core for forming the interior of an elastic tire, the supplemental core attached thereto by an engaging projection and a rod for locking and releasing the same, substantially as described.

2. In combination with a main core adapted to form the interior of an elastic tire, a supplemental mold connected thereto by a pin and recess, and made in sections, substantially as described.

In testimony whereof I hereunto affix my signature in presence of two witnesses.

RALPH MYERS WHITMAN.

Witnesses:
 W. G. BOURNE,
 STANDISH BOURNE.